United States Patent

Poole et al.

[15] 3,653,263
[45] Apr. 4, 1972

[54] INFRARED TEMPERATURE SENSOR AND CONTROL FOR USE WITH HEATED, MOVING BODIES

[72] Inventors: Richard R. Poole; David D. Bulkley, both of Norwalk, Conn.

[73] Assignee: Irtronics, Inc., Stamford, Conn.

[22] Filed: July 15, 1969

[21] Appl. No.: 841,861

[52] U.S. Cl. ..............................................73/351, 73/355 R
[51] Int. Cl. .....................................G01j 5/62, G01k 13/08
[58] Field of Search ....................................73/1 F, 351, 355

[56] References Cited

UNITED STATES PATENTS 3,527,097  9/1970  Deczky....................................73/351
2,151,928  3/1939  Mead......................................73/355 X
3,348,408  10/1967  Engborg................................73/355 X

*Primary Examiner*—Louis R. Prince
*Assistant Examiner*—Frederick Shoon
*Attorney*—Bryan, Parmelee, Johnson & Bollinger

[57] ABSTRACT

A temperature sensor is provided for measuring infrared radiation from a heated, moving processing device. The measurement is made from a "black body" cavity extending within the device being measured and so provides greater accuracy of readings. If the device being measured is cylindrical and rotates, the cavity is along the edge of the rotational surface and may be subdivided so as to provide a chopper for the readings. Control circuitry associated with the infrared detector allows the sensor to control heating elements within the device.

13 Claims, 7 Drawing Figures

INVENTORS
RICHARD R. POOLE
DAVID D. BULKLEY
BY Robertson, Bryan, Parmelee & Johnson.
ATTORNEYS

INFRARED TEMPERATURE SENSOR AND CONTROL FOR USE WITH HEATED, MOVING BODIES

SUMMARY OF THE INVENTION

This invention deals with the measurement and control, through infrared detection, of the temperature of various devices used for heat treatment of materials. In particular, it is directed to moving processing devices such as heated rolls, in which the temperature must be carefully controlled. An example would be a heated roll used for processing synthetic fibers.

The temperature measurement made for use in control is not a direct contact measurement of the temperature of the object itself, but is a non-contact measurement of the infrared radiation emitted by the body. Since the emitted radiation is a function of the temperature of the body, the radiation detector may be calibrated to control actual temperature. By using the infrared radiation and detection method of this invention, greater accuracy, reliability, and repeatability of control are often achieved. The frictional problems associated with contact temperature measurement of moving bodies are eliminated.

Other devices using infrared radiation as a method of temperature determination and control of moving bodies have, of course, been used in the past. To the best of our knowledge, however, in each instance these devices measured an exposed surface of the object and so were subject to possible errors as the surface conditions changed through corrosion, dirt, etc. An example of one such device is given in Troll U.S. Pat. No. 3,369,106.

In the present device, by contrast, the external surface is not used as a source of infrared radiation. Rather, a cavity or slot is milled or bored in an area of the heated device itself proximate to the area where it is desired to measure the temperature. The cavity is located where it will not affect the function of the device and is so positioned as to continually or periodically be sensed by a detector as the body moves. If the cavity is of sufficient depth relative to its width, the infrared radiation received from inside this opening will approach that of a perfect or "black body" radiator. This depth is normally at least 4 times the minimum width.

This invention can be used in many types of rotating structures. It is illustrated here in terms of a heated rotating roll. The roll has a cavity in the shape of a slot along its periphery and running parallel to the axis of the roll. An infrared detector is pointed into the slot and so takes a reading of the infrared radiation coming from the slot.

The edge of the roll having the slot may have a cover plate interrupting the slot periodically so as to act as a chopper. Heating elements of any desired type may be placed within the roll and be controlled by circuitry actuated by the infrared detector.

THE DRAWINGS

The drawings illustrating this invention include:

Figure 3:
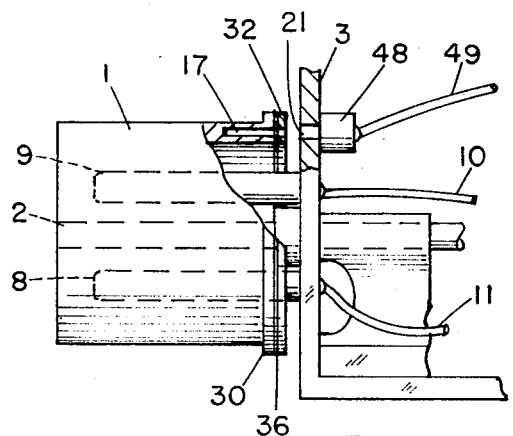

FIG. 3 is a partial side elevation of another form of the invention, the elevation being partially broken away to show more details of the structure. In this form, the slot in the roll is periodically interrupted to produce a chopper effect. The driving mechanism is not shown in FIG. 3, but is like that of FIG. 1.

Figure 4:
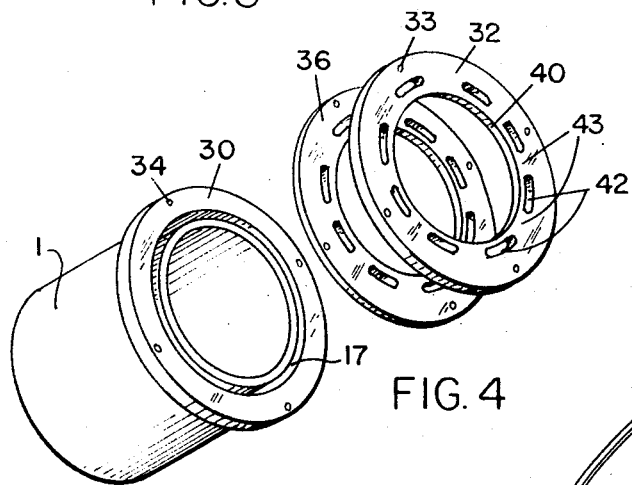

FIG. 4 is an exploded perspective showing the construction of the roll and the cylindrical slot.

Figure 5:
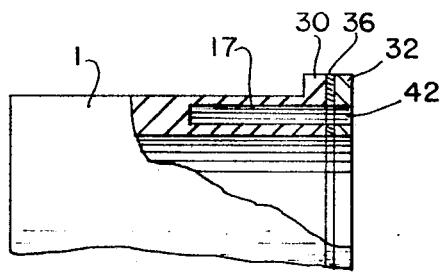

FIG. 5 shows a detail of one portion of the cylinder broken away to show the cross-sectional structure.

Figure 6:
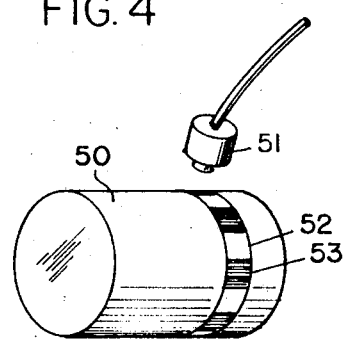

FIG. 6 is a further modification showing a radiation interruptor on the surface of a rotating heated body.

Figure 7:
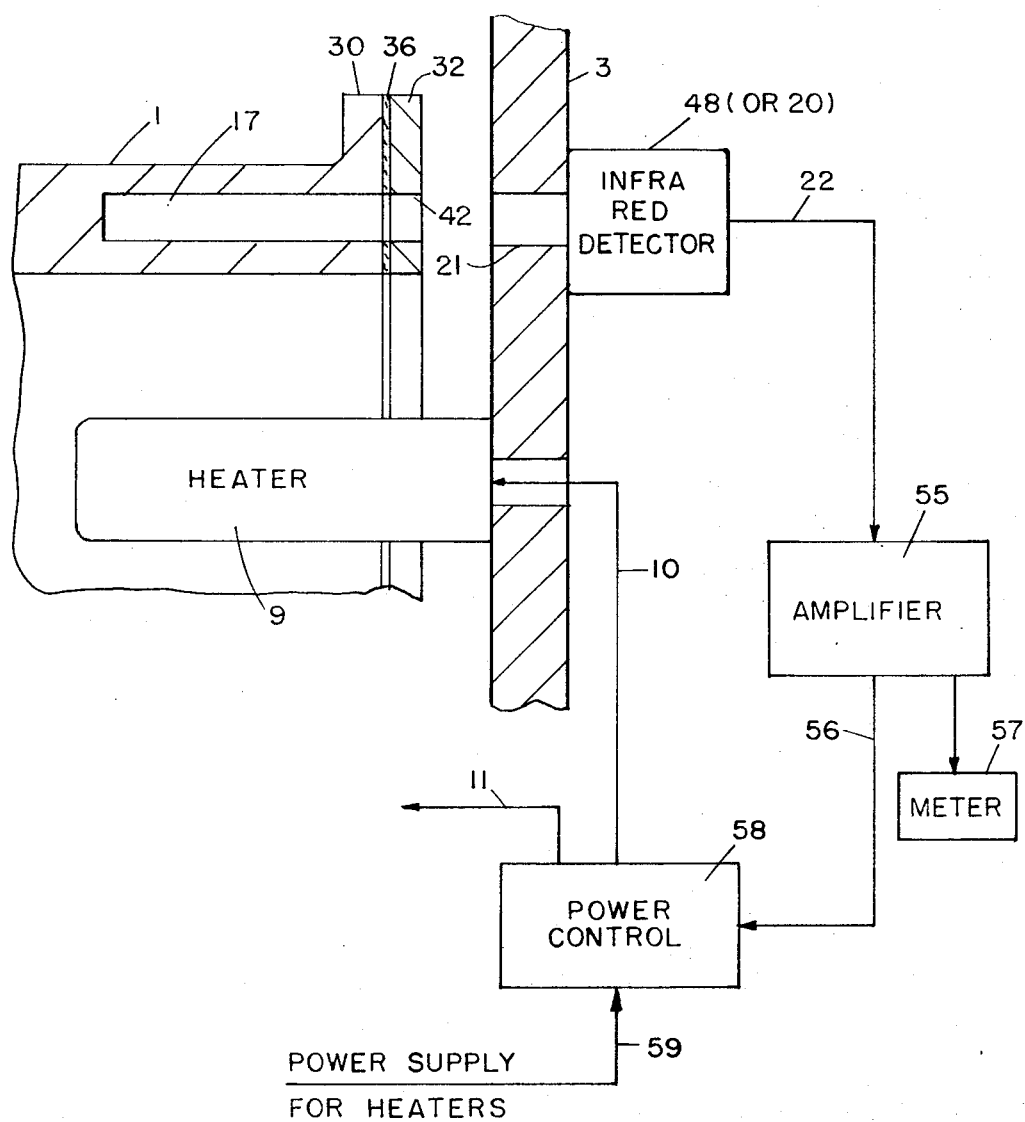

FIG. 7 is a simplified control circuit diagram showing how the detector would be used to control the heating elements for the object being heated.

DETAILED DESCRIPTION OF THE INVENTION

Structure

Figure 1:
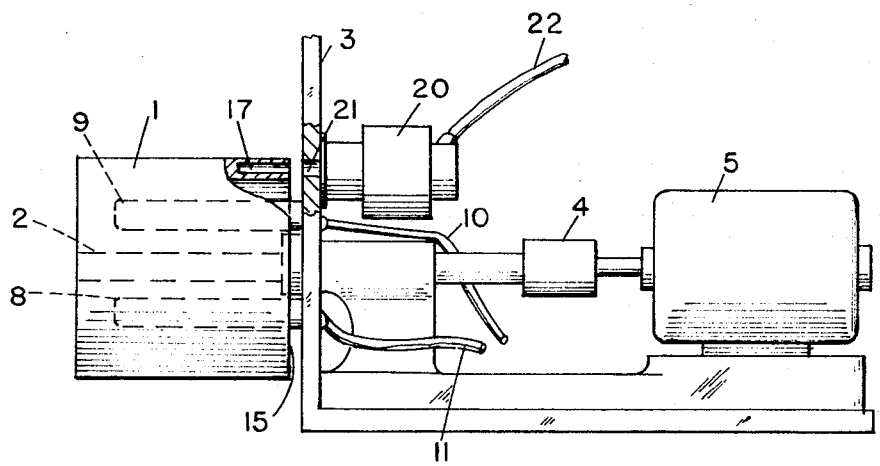
FIG. 1 is a side elevation, partly broken away, of a first form of the invention. In this form the cavity is a slot in the periphery of the cylinder or roll; and the chopper, if one is used, is integral with the infrared detector.

The invention, as shown herein, is used to control the temperature of a heated roll or drum. In FIG. 1 the roll is identified by the numeral 1. It is mounted on a shaft 2 about which it may rotate, the shaft passing through a supporting frame 3 to a coupling 4 and thence to a motor 5. If desired, reducing gears may be placed between motor 5 and shaft 2.

Located within the roll 1 and secured to frame 3 are heating elements 8 and 9. These elements may be of any desired type, but preferably are quartz heating elements. These elements are connected to a power supply (not illustrated) through leads 10 and 11 respectively.

The edge 95 of roll 1 which faces frame 3 has milled in it a slot or groove 17. Slot 17 is proximate to, but beneath, the surface the temperature of which is to be controlled and has an open end. This slot provides the "black body" cavity, referred to above, that is the source of the infrared radiation. Normally a slot or opening will act as a substantially perfect black body radiator, or approach being one, if it has a ratio of length to minimum width of at least 4 to 1. In the practice of this invention such a ratio is preferable. Length, in this instance, is the dimension of the slot which is parallel to the axis of the roll, i.e., the direction seen by the detector. The minimum width would be that measured across the slot.

Since groove 17 is formed along the entire periphery of roll 1, it will have a cylindrical configuration and the same axis as drum 1. The end opening of the groove will face outwardly in a direction parallel to the axis of the roll.

The infrared energy radiated from slot 17 will be, as is well known, a function of the temperature of roll 1 and, in particular, a function of the temperature of the portion of the roll defining the bottom of slot 17. Thus, such a slot along the edge of the roll will emit infrared radiation which when detected and amplified, will produce an electronic signal which is a function of roll surface temperature. A more accurate reading will be obtained if the slot penetrates to a depth in the roll such that its end is right under the working surface. Though this is preferred, it may, in some instances, present structural problems and be a limitation on how deep the slot can go into the roll. The slot should, however, be near enough the desired surface portion so that the infrared radiation detected is functionally related to the surface temperature, i.e., the slot will, in some way, always be a function of surface temperature no matter how deep it is.

Figure 2:
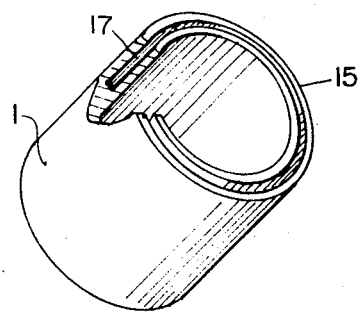
FIG. 2 is a perspective view of the edge of the roll partially broken away to show the slot.

Though the slot is shown in cross-section in FIG. 1, it will be realized from FIG. 2 that the slot extends all the way around the periphery of the roll.

An infrared detector 20 is mounted adjacent to the periphery of the roll to sense the radiation from the slot. As shown in FIG. 1, detector 20 is mounted on supporting frame 3 over an opening 21 in the frame and facing the slot. It is on the opposite side of the frame from cylinder 1. Opening 21 is positioned directly over a portion of slot 17 in drum 1 permitting infrared detector 20 to "view" the inside of slot 17 through opening 21 in frame 3.

Infrared detector 20 may be of any conventional type, such as a lead sulphide detector. It has a "chopper" as part of the unit. (A chopper is a well known device for periodically blocking the radiation passing from an infrared radiator to an infrared detector, and so provides greater accuracy in the readings and improved background discrimination. Choppers as such are described in various publications, such as *Infrared Radiation* by Henry L. Hackforth, 1960, beginning at page 95). The output from the infrared detector 20 passes through leads 22 to the amplifier 55 where it is amplified and converted into an "on-off" or proportional signal. This signal then passes by lead 56 to power control 58 for control of power to heaters 8 and 9 (See FIG. 7).

A modification of this structure is shown in FIGS. 3, 4 and 5. This modification, in essence, involves the discovery that, when a moving surface or cavity, especially a rotating one, is used as the infrared source for an infrared radiation reading, the surface or cavity on the moving device itself may be interrupted to accomplish the function of a chopper. The interruption should be accomplished by something integral with the moving device, such as the use of highly non-radiating, i.e., reflective, paint or plating, the use of a covering chopper mask that will regularly and periodically block or greatly reduce the radiation being detected, or interrupted milling of groove 17. This permits using an infrared detector without a separate chopper and permits reduction in size. A preferred form of interrupter is chopper plate 32 of FIGS. 3, 4 and 5.

(Since most of the elements of FIGS. 3, 4 and 5 are similar to those of FIGS. 1 and 2, similar numbers will be used to identify structure where appropriate. Description, where it would be repetitive, will not be repeated.)

In the modification of FIGS. 3, 4 and 5 a rotating roll 1 is mounted upon a shaft 2. The roll includes a slot 17 along the edge which faces the frame 3, the slot being of sufficient depth relative to its minimum width to be effectively a black body radiator. The roll 1 has a flange or lip 30 extending radially outwardly along the peripheral edge outside slot 17. This lip 30 serves as a base to which an aperture or chopper plate 32 may be secured. Plate 32 fits over the end of roll 1 and is secured by metal screws or bolts through holes 33, in the cover 32, and 34 in lip 30. Preferably a disc or gasket 36, made of an insulating material such as asbestos and having the same shape and hole pattern as plate 32 is sandwiched between plate 32 and roll 1 to minimize heat transfer.

Plate 32 is generally ring-shaped and has a central opening 40 corresponding to the central opening on the end of roll 1. It also has a series of slots 42 at the same radial distance from its axis as slot 17 is from the axis of roll 1. These slots 42 are arcuate in shape and are spaced intermittently around the circumference of plate 32. They are so positioned as to expose portions of slot 17 when plate 32 is mounted on roll 1.

Slots 42 are regularly spaced around plate 32 and preferably expose exactly half of slot 17. Slots 42 are all of the same length; and all the spaces 43 between the slots, which cover slot 17, are of the same length. Spaces 43 may, but do not necessarily have to be, equal in length to the length of slots 42. Thus, with this regular spacing, slot 17 is covered part of the time, and as roll 1 rotates, slot 17 is uncovered for equal and regular time periods, as viewed by stationary detector 48. The result is that chopper plate 32, because integral with the radiating device, can act as a chopper producing a pulsed output while roll 1 is rotating.

As a result of the modification of FIGS. 3, 4 and 5, there is no need for a combined infrared detector and chopper such as 20 in FIG. 1. Instead of that a simple infrared detector 48 connected to the amplifier and control is all that is necessary. This allows the unit to be more compact. It also eliminates the problem of chopper failure sometimes found in high temperature industrial equipment.

For greatest capability, plate 32 should have the minimum radiation efficiency, thus giving it the greatest contrast with radiation received from slot 17 through openings 42. Therefore, it is best to have the exposed surface of plate 32 chrome plated or the like. Similarly, to minimize the conductive heat transmission from roll 1 to plate 32, it is best to have an insulating gasket 36 mounted between roll 1 and plate 32. Gasket 36 should have openings corresponding to those of plate 32 so that it does not interfere with the chopping effect.

Any number of slots 42 may be used as long as they are of equal length and regularly spaced. The slots must, however, each be sufficiently long such that for a maximum desired rate of rotation of roll 1, infrared detector 48 will have an opportunity to satisfy its required rise time. That is, if the slots 42 are so short relative to the rate of rotation that each exposure of detector 48 to groove 17 is for less time than the internal rise time of detector 48, an inaccuracy in reading may result.

FIG. 6 shows another form of interrupter, usable when the infrared detector receives radiation from the surface of a heated rotating body rather than from a cavity. Here a rotating roll 50 has a detector 51 positioned adjacent its surface to receive radiation. On the roll, beneath detector 51 are a series of regularly spaced, equal black body areas. These are formed by providing alternating light 52 (highly reflective) and dark 53 (highly radiative, i.e., black body) areas or sections. These serve as an interrupter or chopper for radiated infrared energy as roll 50 rotates and so produce pulses of radiation. The rate of pulsing is dependent upon the rate of rotation of the body and, of course, upon the number of said areas.

Other forms of interrupter can also be used, whether on a rotating surface or covering a rotating cavity, just as long as they are integral with the rotating body and provide for regular interruption so that the detector has a base line for reading. Preferably, the pulses produced will each have a duration greater than the rise time of the detector.

A diagram showing the control circuitry is given in FIG. 7 (the figure also includes the upper portion of FIG. 3). Infrared detector 48, mounted on frame 3 so that it can take readings through hole 21, has its output fed through lead 22 to an amplifier. The amplifier 55 should be sufficiently broad band such that it can amplify, without distortion, the entire range of frequencies created by the chopper plate 32 over the anticipated speeds of rotation of roll 1. The output of amplifier 55 passes through lead 56 to heater control 58. The other input to the heater control is from a power supply on lead 59. Heater control 58 is adapted to cut off or reduce the power input to the heaters 8 and 9 through leads 11 and 10 respectively when the temperature of roll 1, as indicated by the amount of infrared radiation detected tends to get too hot, and to increase the power or turn it on when the temperature tends to get too low. Thus, an automatic control is provided.

The output of amplifier 55 may also go to meter 57 to give a direct temperature reading.

The circuit would be similar for the structure of FIG. 1, except that a combined detector and chopper 20 would be used instead of detector 48.

Operation

The overall method of operating the system is substantially the same as that of other infrared detection and control systems. Infrared radiation is detected through a calibrated detector, and the resulting output is used to control the heating units. The difference in operation between this system and prior systems lies in the place of detection, that is a cavity or peripheral slot providing black body radiation, and in the use of an interruptor integral with the black body radiator to create a chopper.

The unit of FIGS. 1 and 2 operates by supplying power to the heaters 8 and 9 through leads 10 and 11 and actuating motor 5 to rotate roll 1. Infrared radiation of an amount related to the temperature of roll 1, is produced by the drum. For present purposes, however, the important radiation is that coming from slot 17 on the edge of the roll. Slot 17 has its open side facing to the right as shown in FIG. 1 and a portion of slot 17 is always facing opening 21 in frame 3. A portion of the radiation passes from slot 17 through opening 21 and into the infrared detector 48. In the structure of FIG. 1 detector 20 preferably includes a chopper. The output from detector 20 passes through lead 22 and to amplification and control circuits, like those of FIG. 7 and the control circuit determines the amount of power necessary to be supplied to the heaters so that the desired temperature is reached and maintained within the desired narrow limits.

The unit must, of course, first be calibrated so that the detected radiation is correlated with the temperature of the surface. This can be done by any of the normal methods.

In addition to control, the output of the detector may also go to meter 57 to give a direct temperature reading.

The unit of FIGS. 3, 4 and 5 operates in the same manner as that of FIGS. 1 and 2 except for the chopping action. In the unit of those figures a simple infrared detector 48 is used, facing opening 21, which does not include a separate chopper. Rather the chopping is achieved by the rotation of roll 1 by motor 5 and the regular and periodic opening and closing of slot 17 by the slots 42 and intervening spaces 43 on chopper plate 32. This provides a chopper that is integral with roll 1, directly related to the speed of rotation of roll 1, and, of course, coordinated with its rotation. The speed of operation of the chopper is a function of the speed of rotation of roll 1, but the total exposure of detector 48 to radiation remains constant.

The modification of FIG. 6 operates by having the alternate areas 52 and 53 produce pulses of radiation for detector 51. Use of the detected radiation is the same as for FIGS. 3, 4 and 5.

By way of example of chopper frequency that may be used, chopper plate 32 of FIGS. 3, 4 and 5 includes eight slots 42 around the circumference and eight corresponding and equal intervening spaces 43, giving eight cycles of chopping for each revolution of roll 1. In a typical operation roll 1 may rotate 4,000 revolutions per minute or approximately 66.7 per second. This, then, would give a chopping frequency of 8 × 66.7 or about 533 cps. It will be noted that the chopping frequency is a function of rotation speed, but that the total emitted radiation received by the detector is independent of speed.

By use of this method, a more sensitive temperature component can be obtained. The faster response permits more rapid control of the heating elements, and so a more closely controlled roll temperature.

The foregoing shows the preferred embodiments of the invention. Naturally the concepts may be used in other forms without departing from its spirit.

What is claimed:

1. The method measuring temperature of the surface of a rotating body, said body having a cylindrical configuration and rotating about its axis, and said body having a groove along one edge thereof defining a black body radiator, said method including the steps of positioning an infrared detector adjacent to said groove to detect and measure infrared radiation from said groove while said body is rotating, and thereafter using said detected and measured radiation as a measure of the temperature of said surface.

2. Apparatus for determining the surface temperature of a moving body by use of infrared emissions, said apparatus including said moving body with said surface, said body having an open-ended cavity therein adjacent said surface and moving therewith but not interrupting said surface, said moving cavity defining an infrared radiator, an infrared detector positioned adjacent said moving cavity to receive and measure infrared radiation from said moving cavity, said detector being calibrated relative to the temperature of said surface, whereby said detector may determine the surface temperature of said body by measurement of said infrared radiation, said body being rotatable and including an interrupter integral with said body and positioned over said cavity to cause said radiation to be pulsed when said body is in motion.

3. Apparatus as set forth in claim 2 in which said body is a cylindrical roll, said surface is the outer surface of said drum, and said cavity is a cylindrical groove beginning at one edge of said roll.

4. Apparatus as set forth in claim 3 including a chopper plate mounted on said edge and over said groove, said plate having openings therein partially exposing said groove, said openings being of uniform length and regularly spaced over said groove, whereby, when said roll is rotated, said plate will act as an infrared chopper to produce a pulsed output in said detector.

5. Apparatus as set forth in claim 4 in which said chopper plate has a mirrored surface on the side thereof facing said detector to reduce radiation and including a thermally-insulating gasket between said plate and the edge of said roll.

6. Temperature determination apparatus for measurement of the temperature of the surface of a rotating heated roll, including a groove in one edge of said roll, said groove extending into said roll to a point sufficiently proximate to said surface so that said groove will emit infrared radiation in an amount functionally related to the temperature of said surface, an infrared detector adjacent said groove for measuring infrared radiation being emitted therefrom, said detector being calibrated relative to said surface temperature whereby said detector may be used to determine the temperature of said surface.

7. Apparatus as set forth in claim 6 in which said groove is so dimensioned as to be substantially a black body radiator and in which said detector is positioned so as to receive radiation from the bottom of said groove.

8. Apparatus as set forth in claim 6 including an interrupter integral with said roll to interrupt said groove periodically so that, as said roll is rotated, the infrared emissions received by said detector are pulsed.

9. Apparatus as set forth in claim 8 in which said interrupter is a chopper plate mounted on the edge of said drum and over said groove, said plate having evenly-spaced openings therein exposing portions of said groove.

10. In an infrared detection system for determining the temperature of a heated rotating body having an infrared radiating section, that improvement including a detector positioned relative to said body so as to receive infrared radiation from said section, an interrupter associated with said section and integral with said heated body to regularly interrupt said infrared radiation from said section and thereby pulse the radiation received by said detector, said rate of pulsing being dependent upon the rate of rotation of said body.

11. In an infrared detection system as set forth in claim 10, that improvement in which said radiating section is a cavity in said heated body.

12. In an infrared detection system as set forth in claim 11, that improvement in which said interrupter is a reflective plate partially covering said cavity.

13. In an infrared detection system as set forth in claim 10, that improvement in which said radiating section is a portion of the surface of said heated body and said interrupter is a means on said surface for regularly varying the intensity of infrared radiation from said portion as said body rotates.

* * * * *